(12) United States Patent
Ennis

(10) Patent No.: US 6,427,277 B1
(45) Date of Patent: Aug. 6, 2002

(54) SIDE BRUSH ASSEMBLY FOR VEHICLE CLEANING APPARATUS

(75) Inventor: G. Thomas Ennis, Inglewood, CA (US)

(73) Assignee: N/S Corporation, CA (US)

( * ) Notice: Subject to any disclaimer, the term of this patent is extended or adjusted under 35 U.S.C. 154(b) by 0 days.

(21) Appl. No.: 09/562,761

(22) Filed: May 2, 2000

(51) Int. Cl.⁷ .................................................. B60S 3/06
(52) U.S. Cl. ........................ 15/53.2; 15/53.3; 15/97.3; 15/DIG. 2; 15/53.1
(58) Field of Search .............................. 15/53.1, 53.2, 15/53.3, 53.4, 97.3, DIG. 2

(56) References Cited

U.S. PATENT DOCUMENTS 3,689,954 A  *  9/1972  Grant

* cited by examiner

*Primary Examiner*—Randall E. Chin
(74) *Attorney, Agent, or Firm*—Mattingly, Stanger & Malur, P.C.

(57) ABSTRACT

A side brush assembly for a vehicle cleaning apparatus includes upper and lower side support members having upper and lower support arms attached thereto. An outer breakaway end portion is pivotally attached to the lower support arm and a control bracket having a slot therein is attached to the outer end of the breakaway end portion. A rotatable brush mounted on a brush shaft has an upper end of the brush shaft supported by mounting means attached to the upper support arm and a lower end of the brush shaft received in the slot of the control bracket so that the lower end may move inwardly and outwardly in a controlled fashion in the slot.

12 Claims, 2 Drawing Sheets

SIDE BRUSH ASSEMBLY FOR VEHICLE CLEANING APPARATUS

BACKGROUND OF THE INVENTION

1. Field of the Invention

The present invention relates to an improved side brush assembly for a vehicle cleaning apparatus and, more particularly, to a side brush assembly having a rotatable brush wherein the bottom of the brush may swing inwardly and outwardly in a controlled movement upon contact with an object.

2. Description of the Related Art

In the field of mechanized vehicle cleaning, rotatable brushes are used to clean a vehicle. Some of these brushes are known as wrap-around rotating brushes wherein the same brush cleans the front side and the back of a vehicle. Other cleaning devices use only a side brush which only cleans the sides of a vehicle or other item being washed. Even though such side brushes are only used to clean the sides of a vehicle, however, the prior art side brushes pivot as a vehicle is being cleaned and thus require bearings to support such pivotal movement. Moreover, prior art side brushes have difficulty in adjusting to different sized vehicles and protrusions which extend from the sides of vehicles as the protrusions encounter the side brush.

SUMMARY OF THE INVENTION

It is an object of the present invention to provide a side brush assembly for a vehicle cleaning apparatus which can adjust to different sized vehicles and allows for protruding parts on the vehicle or other item being washed without requiring the use of bearings.

A further object of the invention is to provide a side brush assembly for a vehicle cleaning apparatus wherein the bottom of the rotary brush may swing inwardly and outwardly in a controlled movement.

Another object of the invention is to provide a side brush assembly for a vehicle cleaning apparatus wherein the rotary brush is rotated by a motor mounted on a side frame support member directly above at least a portion of the brush.

Still another object of the invention is to provide a side brush assembly for a vehicle cleaning apparatus wherein the rotatable brush is connected to a drive motor through a flexible coupling which allows movement of the brush in all directions.

The present invention achieves the above and other objects by providing a side brush assembly for a vehicle cleaning apparatus which includes an upper side support member and a lower side support member and an upper support arm attached to the upper side support member and a lower support arm attached to the lower side support member. An outer breakaway end portion is pivotally attached to the lower support arm whereby the end portion may pivot upwardly and outwardly when the brush encounters an obstacle. A control bracket having a slot therein is fixedly attached to the outer end of the breakaway end portion.

The assembly further includes a rotatable brush mounted on a brush shaft with the upper end of the brush shaft being supported by mounting means attached to the upper support arm and the lower end of the brush shaft being received in the slot of the control bracket whereby the lower end of the brush may move freely inwardly and outwardly in the slot. The upper support arm and the lower support arm are adjustably mounted to the upper side support member and the lower side support member, respectively, whereby the upper support arm and the lower support arm may be adjusted inwardly and outwardly with respect to the upper side and lower side support members. The pivot axis of the breakaway end portion is mounted at an angle to the lower support arm. A motor is mounted on the upper support member directly above at least part of the brush for rotating the brush and is connected to the brush shaft by a flexible coupling whereby the brush may flex or tilt in all directions.

These and other features and advantages of the present invention will become more apparent with reference to the following detailed description and drawings.

DETAILED DESCRIPTION OF THE PREFERRED EMBODIMENTS

Figure 1:
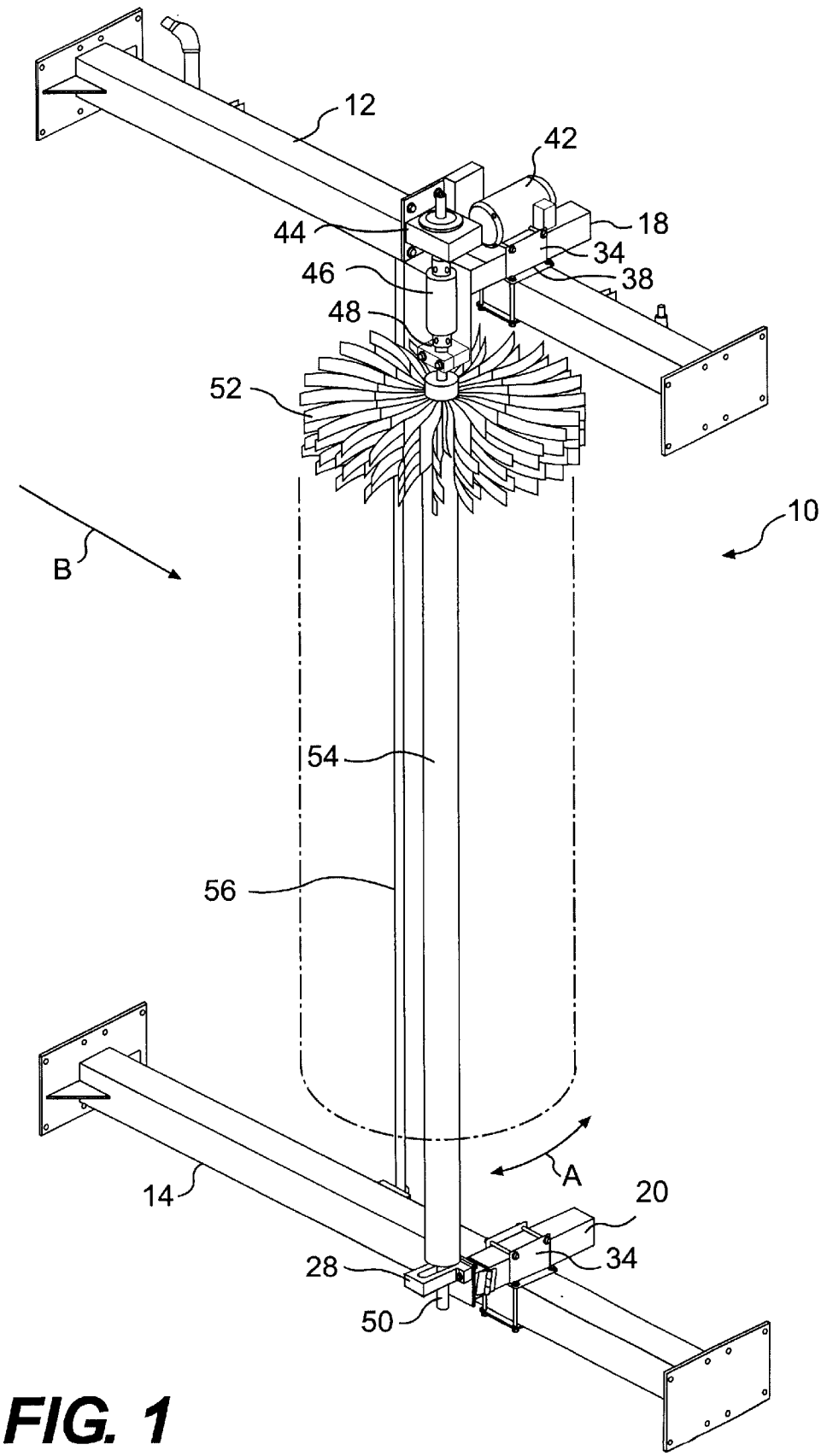
FIG. 1 is an isometric view of a side brush assembly for a vehicle cleaning apparatus according to the present invention illustrating a rotatable side brush mounted between upper and lower support members.
Figure 2:
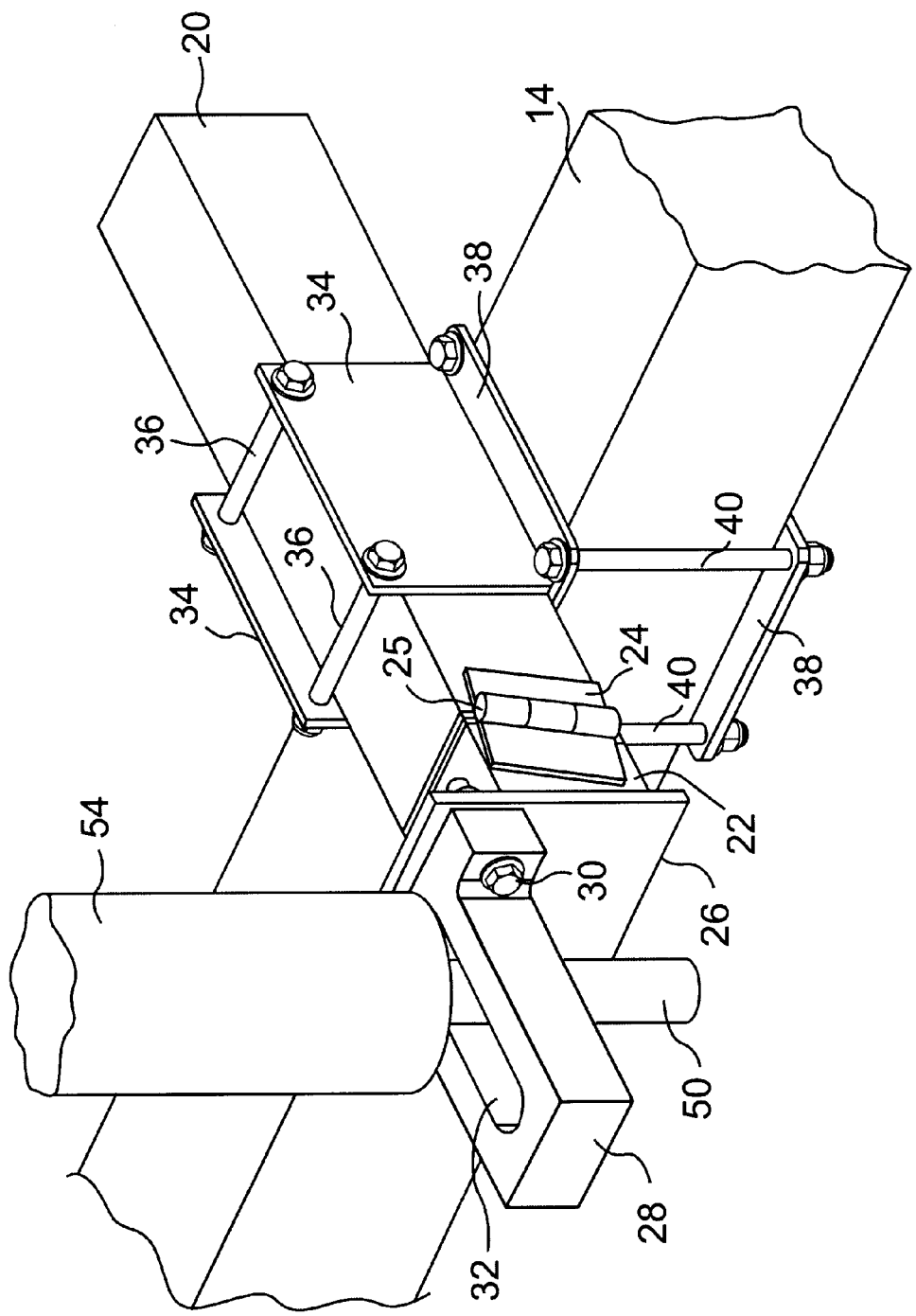
FIG. 2 is an enlarged isometric view of the apparatus for controlling the bottom movement of the rotatable brush.

Referring to FIGS. 1 and 2 of the drawings, a side brush assembly, generally referred to by the numeral 10, for a vehicle washing apparatus is shown. The side brush assembly includes an upper side support member 12 and a lower side support member 14, both of which may be part of the frame of a vehicle cleaning apparatus.

An upper support arm 18 is adjustably attached to upper side support member 12 so as to be positioned perpendicular to the longitudinal axis of the upper side support member. A lower support arm 20 is adjustably attached or mounted to lower side support member 14 and positioned perpendicular to the longitudinal axis of the lower side support member.

An outer breakaway end portion 22 is pivotally attached to an outer end of the lower support arm 20. A hinge 24 pivotally connects breakaway end portion 22 with the lower support arm 20. As clearly shown in FIG. 2, the hinge 24 has a pivot axis 25 mounted at an angle with respect to a perpendicular plane extending the lower support arm 20. Preferably, the hinge is at an angle of approximately 30° with respect to the perpendicular plane. By mounting the hinge 24 an angle, when breakaway end portion 22 is pivoted, it moves outwardly and upwardly for a reason to be explained more fully hereafter.

The outer end of breakaway end portion 22 has a plate 26 fixedly attached thereto. A movement control bracket 28 is fixedly attached to the outside of plate 26 by any suitable means such as bolts 30. Control bracket 28 is provided with an elongated slot 32 therein.

The lower support arm 20 is adjustably mounted between a pair of spaced plates 34 fastened together by bolts 36. By loosening the bolts 36, the lower support arm 20 may be moved inwardly and outwardly as desired. The lower arm 20 and the plates 34 are attached to lower side support member 14 by another pair of spaced plates 38 fastened together by bolts 40. By loosening the bolts 40, the lower arm support 20 may be moved longitudinally of the lower side support member 14. The plates 34 and 38 may be fastened together by any suitable means such as by welding.

Similarly, the upper support arm 18 is adjustably held between a pair of spaced plates 34 fastened together by bolts whereby the upper support arm 18 may be adjusted inwardly and outwardly by loosening the bolts fastening the plates together. The upper support arm 18 and the plates 34 are adjustably attached to the upper side support member 12 by another pair of spaced plates 38 fastened together by bolts in the same manner as that described with respect to the lower support arm 20. Accordingly, the upper support arm 18 may be adjusted longitudinally along the upper side support member 12 by loosening the bolts fastening the plates 38 together.

A motor 42 is mounted on spaced plates 34 above the upper support arm 18. The motor is connected by a shaft to a gear box 44 having a rotatable connecting element 46 attached thereto and extending downwardly. Attached to the bottom of rotating connecting element 46 is a flexible coupling 48 which in turn is connected to the upper end of a brush shaft 50 having a rotatable brush 52 mounted thereon. The flexible coupling 48 may be of the type shown and described in my prior U.S. Pat. No. 4,225,995, which is incorporated herein by reference.

The brush 52 has a core element 54 in the center thereof which surrounds the brush shaft 50. One or more pipes 56 are attached to the assembly to provide cleaning fluids, such as soap and water, during the cleaning operation.

As shown in FIG. 1, the arrow A at the bottom of brush 52 indicates that the direction of rotation of the brush may be either clockwise or counterclockwise. The arrow B shown in the upper left hand side of FIG. 1 indicates the direction of movement of a vehicle or other item being cleaned.

In operation of the side brush assembly of the present invention, a brush is properly positioned along the upper side support member 12 and the lower side support member 14 to accommodate a particular sized vehicle or other item to be cleaned. Rotation of the brush is then started and a vehicle is moved in the direction shown by the arrow B to come in contact with the rotating brush. Cleaning fluids such as water and soap may be provided through one or more pipes 56 during the cleaning operation as the vehicle passes by and comes in contact with the brush 52. Although only one brush assembly is shown for the left hand side of the vehicle cleaning apparatus, a similar unit may be provided on the opposite side of the vehicle cleaning apparatus having a construction the same as that described with respect to the side brush assembly 10. To accommodate for brush wear after the drive brush assembly has been operated for a time, the upper support arm 18 and the lower support arm 14 may be adjusted through the spaced plates 34 inwardly or outwardly.

The side brush assembly of the present invention affords many advantages. As previously described, the brush assembly may be moved inwardly and outwardly to accommodate for brush wear and to accommodate different sized vehicles. The lower or bottom end of the brush shaft 50 is loosely received within slot 32 of the control bracket 28 whereby the bottom of the brush may swing outwardly in a controlled movement upon encountering a protrusion or other object along side of a vehicle. Moreover, the control bracket 28 is fixedly attached to an outer breakaway end portion 22 attached to the end of the lower support arm 20. With this construction, when a substantial protrusion or other item contacts the brush with sufficient force, the breakaway end portion 22 pivots outwardly and upwardly and the bottom of the brush shaft moves freely in the slot 28 to move the brush out of the way and let the vehicle or other obstacle pass without damaging the brush assembly. By positioning the hinge 24 connecting the breakaway end portion 22 to the end of the lower support arm 20 at an angle to the lower support arm, the breakaway end portion pivots outwardly and upwardly whereby the bottom end of the shaft 50 does not come out of the slot 28.

Another significant advantage of the present invention is that by having the side brush being able to move inwardly and outwardly no costly moving parts and other elements such as bearings are required. This reduces the cost of the brush assembly and permits easier and more economical maintenance. In addition, through the use of a flexible coupling 48, the brush is allowed to tilt in all directions while still maintaining an operative connection to the drive means which include the motor 42 and the gear box 44.

Numerous other modifications and adaptations of the present invention will be apparent to those skilled in the art and thus, it is intended by the following claims, to cover all such modifications and adaptations which fall within the true spirit and scope of the invention.

What is claimed is:

1. A side brush assembly for a vehicle cleaning apparatus comprising:
   an upper side support member and a lower side support member;
   a rotatable brush mounted on a brush shaft; and
   means attached to said upper side support member for mounting an upper end of said brush shaft and means attached to said lower side support member for receiving a lower end of said brush shaft; and wherein
   said means attached to said lower side support member includes a control bracket having a slot therein for receiving said lower end of said brush shaft whereby said lower end may move freely inwardly and outwardly in said slot.

2. A side brush assembly according to claim 1, wherein said means attached to said lower side support member further includes a lower support arm having an outer breakaway end portion pivotally attached thereto, and wherein said control bracket is fixedly attached to an outer end of said outer breakaway end portion of said lower support arm.

3. A side brush assembly according to claim 2, wherein a pivot axis of said breakaway end portion is at an angle to said lower support arm.

4. A side brush assembly according to claim 2, wherein said lower support arm is adjustably mounted to said lower side support member whereby said lower support arm may be adjusted inwardly and outwardly with respect to said lower side support member.

5. A side brush assembly according to claim 4, wherein said means attached to said upper side support member includes an upper support arm adjustable mounted to said upper side support member whereby said upper support arm may be adjusted inwardly and outwardly with respect to said upper side support member.

6. A side brush assembly according to claim 1, which further includes a motor for rotating said brush and a flexible coupling operatively connecting said brush shaft to said motor.

7. A side brush assembly according to claim 6, wherein said motor is mounted on said upper side support member.

8. A side brush assembly for a vehicle cleaning apparatus comprising:
   an upper side support member and a lower side support member;
   an upper support arm attached to said upper side support member and a lower support arm attached to said lower side support member;
   an outer breakaway end portion pivotally attached to said lower support arm;

a control bracket having a slot therein fixedly attached to an outer end of said outer breakaway end portion; and a rotatable brush mounted on a brush shaft, with an upper end of said brush shaft being supported by mounting means attached to said upper support arm and a lower end of said brush shaft being received in said slot whereby said lower end may move freely inwardly and outwardly in said slot.

9. A side brush assembly according to claim 8, wherein said upper support arm and said lower support are adjustably mounted to said upper side support member and said lower side support member, respectively, whereby said upper support arm and said lower support arm may be adjusted inwardly and outwardly with respect to said upper side and said lower side support members.

10. A side brush assembly according to claim 8, wherein a pivot axis of said breakaway end portion is at angle to said lower support arm.

11. A side brush assembly according to claim 8, which further includes a motor for rotating said brush and a flexible coupling operatively connecting said brush shaft to said motor.

12. A side brush assembly according to claim 11, wherein said motor is mounted on said upper side support member.

* * * * *